(12) United States Patent
Rix et al.

(10) Patent No.: US 8,835,577 B2
(45) Date of Patent: Sep. 16, 2014

(54) CATALYST SYSTEMS HAVING A TAILORED HYDROGEN RESPONSE

(75) Inventors: Francis C. Rix, League City, TX (US); Sun-Chueh Kao, Pearland, TX (US); Rainer Kolb, Kingwood, TX (US); Dongming Li, Houston, TX (US); Cesar A. Garcia-Franco, Houston, TX (US)

(73) Assignee: Univation Technologies, LLC, Houston, TX (US)

( * ) Notice: Subject to any disclaimer, the term of this patent is extended or adjusted under 35 U.S.C. 154(b) by 64 days.

(21) Appl. No.: 13/321,736

(22) PCT Filed: May 14, 2010

(86) PCT No.: PCT/US2010/034964
§ 371 (c)(1),
(2), (4) Date: Jul. 11, 2012

(87) PCT Pub. No.: WO2011/087520
PCT Pub. Date: Jul. 21, 2011

(65) Prior Publication Data
US 2012/0271017 A1    Oct. 25, 2012

Related U.S. Application Data

(63) Continuation-in-part of application No. 12/741,142, filed as application No. PCT/US2008/012823 on Nov. 14, 2008, now Pat. No. 8,088,704, application No. 13/321,736, which is a continuation-in-part of application No. 12/741,137, filed as application No. PCT/US2008/012691 on Nov. 12, 2008, now Pat. No. 8,586,497.

(60) Provisional application No. 61/289,111, filed on Dec. 22, 2009, provisional application No. 61/003,181, filed on Nov. 15, 2007.

(51) Int. Cl.
| | | |
|---|---|---|
| *C08F 4/653* | (2006.01) | |
| *C08F 4/642* | (2006.01) | |
| *C08F 4/6592* | (2006.01) | |
| *C08F 10/00* | (2006.01) | |
| *C08L 23/00* | (2006.01) | |
| *C08F 210/16* | (2006.01) | |
| *C08F 4/659* | (2006.01) | |

(52) U.S. Cl.
CPC ............ *C08F 10/00* (2013.01); *C08F 4/659* (2013.01); *C08F 4/65916* (2013.01); *C08F 4/65912* (2013.01); *C08F 210/16* (2013.01); *C08F 4/65925* (2013.01); *Y10S 526/943* (2013.01)
USPC ........... 526/113; 526/114; 526/160; 526/161; 526/165; 526/172; 526/348; 526/943

(58) Field of Classification Search
CPC ...... C08F 4/64079; C08F 4/642; C08F 4/646; C08F 4/6592; C08F 10/00; C08L 23/00

USPC ............... 526/113, 114, 116, 172, 348, 943; 502/103, 113, 152, 171
See application file for complete search history.

(56) References Cited

U.S. PATENT DOCUMENTS

| | | |
|---|---|---|
| 4,530,914 A | 7/1985 | Ewen et al. |
| 4,659,685 A | 4/1987 | Coleman, III et al. |
| 4,937,299 A | 6/1990 | Ewen et al. |
| 5,032,562 A | 7/1991 | Lo et al. |
| 5,183,867 A | 2/1993 | Welborn, Jr. |
| 5,470,811 A | 11/1995 | Jejelowo et al. |
| 5,516,848 A | 5/1996 | Canich et al. |
| 5,525,678 A | 6/1996 | Mink et al. |
| 5,665,818 A | 9/1997 | Tilston et al. |
| 5,696,045 A | 12/1997 | Winter et al. |
| 6,232,410 B1 | 5/2001 | Rowland et al. |
| 6,268,448 B1 | 7/2001 | Collins et al. |
| 6,492,472 B2 | 12/2002 | Lue et al. |
| 6,828,394 B2 | 12/2004 | Vaughan et al. |
| 6,956,094 B2 | 10/2005 | Mawson et al. |
| 6,964,937 B2 | 11/2005 | Mink et al. |
| 6,995,109 B2 | 2/2006 | Mink et al. |
| 7,129,302 B2 | 10/2006 | Mink et al. |
| 7,141,632 B2 | 11/2006 | Vaughan et al. |
| 7,163,906 B2 | 1/2007 | McDaniel et al. |
| 7,172,987 B2 | 2/2007 | Kao et al. |
| 7,199,072 B2 | 4/2007 | Crowther et al. |

(Continued)

FOREIGN PATENT DOCUMENTS

| | | |
|---|---|---|
| EP | 310734 B1 | 11/1994 |
| EP | 516018 B1 | 3/1996 |

(Continued)

OTHER PUBLICATIONS

Gorl et al, "The combination of mononuclear metallocene and phenoxyimine complexes to give trinuclear catalysts for the polymerization of ethylene" Journal of Organometallic Chemistry, Elsevier-Sequoia S.A. Lausanne, CH LINKD-DOI: 10.1016/j.jorganchem.2007.05.036, vol. 692, No. 26, Nov. 21, 2007, pp. 2727-5753, xp022356683.

*Primary Examiner* — Caixia Lu
(74) *Attorney, Agent, or Firm* — Jennifer A. Schmidt; Kristina Leavitt (57) ABSTRACT

A polymerization catalyst system and polymerization processes using the catalyst systems are disclosed. The polymerization catalyst systems may include a) a first catalyst compound, and b) a second catalyst compound, wherein the first catalyst compound comprises a biphenyl phenol compound having essentially no hydrogen response.

8 Claims, 1 Drawing Sheet

(56) References Cited

U.S. PATENT DOCUMENTS

| | | |
|---|---|---|
| 2002/0119890 A1 | 8/2002 | Wenzel et al. |
| 2004/0010103 A1* | 1/2004 | Boussie et al. ............ 526/127 |
| 2005/0148744 A1 | 7/2005 | Kao |
| 2009/0306323 A1* | 12/2009 | Kolb et al. ............ 526/348.4 |
| 2010/0234547 A1 | 9/2010 | Kolb et al. |
| 2010/0261861 A1 | 10/2010 | Kolb et al. |

FOREIGN PATENT DOCUMENTS

| | | |
|---|---|---|
| EP | 743327 A2 | 11/1996 |
| EP | 527221 B1 | 9/1997 |
| EP | 729387 B1 | 9/1999 |
| EP | 0676418 B1 | 7/2000 |
| EP | 1368388 B1 | 3/2009 |
| WO | 9609328 A1 | 3/1996 |
| WO | 9735891 A1 | 10/1997 |
| WO | 9849209 A1 | 11/1998 |
| WO | 0140330 A1 | 6/2001 |
| WO | 0162808 A1 | 8/2001 |
| WO | 0246250 A2 | 6/2002 |
| WO | 02060963 A1 | 8/2002 |
| WO | 2006086104 A1 | 8/2006 |
| WO | 2007035485 A1 | 3/2007 |
| WO | 2008060512 A1 | 5/2008 |
| WO | 2009064482 A1 | 5/2009 |

* cited by examiner

CATALYST SYSTEMS HAVING A TAILORED HYDROGEN RESPONSE

CROSS REFERENCE TO RELATED APPLICATION

This application is (i) a National Stage application under 35 U.S.C. §371 of International Application No. PCT/US2010/034964 filed on May 14, 2010, that claims the benefit of U.S. Provisional Application Ser. No. 61/289,111, filed Dec. 22, 2009; (ii) a continuation-in-part of U.S. application Ser. No. 12/741,142, filed May 3, 2010, a National Stage application under 35 U.S.C. §371 of International Application No. PCT/US2008/012823, filed Nov. 14, 2008, that claims the benefit of U.S. Provisional Application Ser. No. 61/003,181, filed Nov. 15, 2007; and (iii) a continuation-in-part of U.S. application Ser. No. 12/741,137, filed May 3, 2010, a National Stage application under 35 U.S.C. §371 of International Application No. PCT/US2008/012691, filed Nov. 12, 2008, that claims the benefit of U.S. Provisional Application Ser. No. 61/003,181, filed Nov. 15, 2007; the disclosures of which are incorporated by reference in their entireties.

FIELD OF THE INVENTION

Disclosed herein are catalyst systems useful for the production of polymers. The catalyst system may comprise one or more catalyst compounds having a nil or negligible hydrogen response. The catalyst system may be a mixed metal or bimetallic catalyst system. The one or more catalyst compounds having a nil or negligible hydrogen response may comprise a biphenyl phenol compound.

BACKGROUND

Polyolefin resins having bimodal molecular weight distributions and/or bimodal composition distributions are desirable in a number of applications. Resins including a mixture of a relatively higher molecular weight ("HMW") polyolefin and a relatively lower molecular weight ("LMW") polyolefin can be produced to take advantage of the increased strength properties of HMW resins and the better processing characteristics of LMW resins.

Bimetallic catalysts such as those disclosed in U.S. Pat. Nos. 5,032,562 and 5,525,678, and European Patent EP 0 729 387, can produce bimodal polyolefin resins in a single reactor. These catalysts typically include a non-metallocene catalyst component and a metallocene catalyst component which produce polyolefins having different average molecular weights. U.S. Pat. No. 5,525,678, for example, discloses a bimetallic catalyst including a titanium non-metallocene component which produces a HMW resin, and a zirconium metallocene component which produces a LMW.

As stated in U.S. Pat. No. 6,995,109, controlling the relative amounts of each catalyst in a reactor, or the relative reactivity of the different catalysts, allows control of the bimodal product resin. Other background references include EP 0 676 418, WO 98/49209, WO 97/35891, and U.S. Pat. No. 5,183,867.

Bimetallic catalysts are also disclosed in, for example, U.S. Pat. Nos. 7,199,072, 7,141,632, 7,172,987, 7,129,302, 6,964,937, 6,956,094, and 6,828,394.

Hydrogen gas is often used in olefin polymerization to control the final properties of the polyolefin, where the hydrogen gas acts as a chain transfer agent during polymerization. Single metal based catalysts using hydrogen as a chain transfer agent may produce a polymerization product with relatively predictable molecular weight and molecular weight distribution, as changes in reactor hydrogen concentration may be used to predictably and controllably alter the molecular weight and molecular weight distribution of the resulting polymer.

Bimetallic catalysts such as those described in the patents listed above, however, typically include catalyst components having different hydrogen responses (each having a different reactivity toward hydrogen). For example, a first catalyst component may have a higher response to changes in reactor hydrogen concentration than a second catalyst component. Thus, in contrast to single metal based catalysts, a change in reactor hydrogen concentration may affect molecular weight, molecular weight distributions, and other properties of the resulting bimodal polymer when using a bimetallic catalyst. Owing to the differing hydrogen response of the components in the bimetallic catalyst, control of polymer properties is considerably more complicated and less predictable, as there is an additional independent variable (a second catalyst having a different hydrogen response) affecting polymerization dynamics.

A need exists for bimetallic catalyst systems having predictable and controllable responses to changes in reactor hydrogen concentration.

SUMMARY

Disclosed herein are polymerization catalyst systems including: a first catalyst compound; and a second catalyst compound; wherein the first catalyst compound comprises a biphenyl phenol-containing compound having essentially no hydrogen response. Also disclosed herein, are processes for producing a polyolefin, including: contacting at least one olefin monomer with the above described catalyst system in a polymerization reactor to form a polyolefin.

Other aspects and advantages will be apparent from the following description and the appended claims.

DEFINITIONS

As used herein, the singular forms "a," "an," and "the" include plural referents unless otherwise specified. Thus, for example, reference to "a leaving group" as in a moiety "substituted with a leaving group" includes more than one leaving group, such that the moiety may be substituted with two or more such groups. Similarly, reference to "a halogen atom" as in a moiety "substituted with a halogen atom" includes more than one halogen atom, such that the moiety may be substituted with two or more halogen atoms, reference to "a substituent" includes one or more substituents, reference to "a ligand" includes one or more ligands, and the like.

As used herein, all reference to the Periodic Table of the Elements and groups thereof is to the NEW NOTATION published in HAWLEY'S CONDENSED CHEMICAL DICTIONARY, Thirteenth Edition, John Wiley & Sons, Inc., (1997) (reproduced there with permission from IUPAC), unless reference is made to the Previous IUPAC form noted with Roman numerals (also appearing in the same), or unless otherwise noted.

The present disclosure provides catalyst systems for olefin polymerization, methods of making and methods of using said catalyst systems, and polymers and products made therewith. The terms "mixed catalyst system" and "mixed catalyst" may be used interchangeably herein with "catalyst system."

As used herein, the phrase "characterized by the formula" and/or "characterized by the structure" is not intended to be limiting and is used in the same way that "comprising" is commonly used. The term "independently selected" is used herein to indicate that the R groups, e.g., $R^1$, $R^2$, $R^3$, $R^4$, and $R^5$ can be identical or different (e.g. $R^1$, $R^2$, $R^3$, $R^4$, and $R^5$ may all be substituted alkyls or $R^1$ and $R^2$ may be a substituted alkyl and $R^3$ may be an aryl, etc.). Use of the singular includes use of the plural and vice versa (e.g., a hexane solvent, includes hexanes). A named R group will generally have the structure that is recognized in the art as corresponding to R groups having that name.

The terms "precatalyst", "catalyst", "precatalyst metal compound", "catalyst metal compound", "catalyst component" are generally used interchangeably in this specification, but those of skill in the art may recognize certain precatalysts as catalysts and vice versa.

The terms "monomer" and "comonomer" are generally used interchangeably in this specification, but those of skill in the art may recognize certain monomers as comonomers and vice versa.

For the purposes of illustration, representative certain groups are defined herein. These definitions are intended to supplement and illustrate, not preclude, the definitions known to those of skill in the art. "Optional" or "optionally" means that the subsequently described event or circumstance may or may not occur, and that the description includes instances where said event or circumstance occurs and instances where it does not. For example, the phrase "optionally substituted hydrocarbyl" means that a hydrocarbyl moiety may or may not be substituted and that the description includes both unsubstituted hydrocarbyl and hydrocarbyl where there is substitution.

The term "alkyl" as used herein refers to a branched or unbranched saturated hydrocarbon group typically although not necessarily containing 1 to about 50 carbon atoms, such as methyl, ethyl, n-propyl, isopropyl, n-butyl, isobutyl, t-butyl, octyl, decyl, and the like, as well as cycloalkyl groups such as cyclopentyl, cyclohexyl and the like. Generally, although again not necessarily, alkyl groups herein may contain 1 to about 12 carbon atoms. The term "lower alkyl" intends an alkyl group of one to six carbon atoms, specifically one to four carbon atoms. The term alkyl also refers to divalent alkyls such as —$CR_2$— which may be referred to as alkylenes or hydrocarbylenes and may be substituted with one or more substituent groups or heteroatom containing groups. "Substituted alkyl" refers to alkyl substituted with one or more substituent groups (e.g., benzyl or chloromethyl), and the terms "heteroatom-containing alkyl" and "heteroalkyl" refer to alkyl in which at least one carbon atom is replaced with a heteroatom (e.g., —$CH_2OCH_3$ is an example of a heteroalkyl).

The term "alkenyl" as used herein refers to a branched or unbranched hydrocarbon group typically although not necessarily containing 2 to about 50 carbon atoms and at least one double bond, such as ethenyl, n-propenyl, isopropenyl, n-butenyl, isobutenyl, octenyl, decenyl, and the like. Generally, although again not necessarily, alkenyl groups herein contain 2 to about 12 carbon atoms. The term "lower alkenyl" intends an alkenyl group of two to six carbon atoms, specifically two to four carbon atoms. "Substituted alkenyl" refers to alkenyl substituted with one or more substituent groups, and the terms "heteroatom-containing alkenyl" and "heteroalkenyl" refer to alkenyl in which at least one carbon atom is replaced with a heteroatom.

The term "alkynyl" as used herein refers to a branched or unbranched hydrocarbon group typically although not necessarily containing 2 to about 50 carbon atoms and at least one triple bond, such as ethynyl, n-propynyl, isopropynyl, n-butynyl, isobutynyl, octynyl, decynyl, and the like. Generally, although again not necessarily, alkynyl groups herein may have 2 to about 12 carbon atoms. The term "lower alkynyl" intends an alkynyl group of two to six carbon atoms, specifically three or four carbon atoms. "Substituted alkynyl" refers to alkynyl substituted with one or more substituent groups, and the terms "heteroatom-containing alkynyl" and "heteroalkynyl" refer to alkynyl in which at least one carbon atom is replaced with a heteroatom.

The term "alkoxy" as used herein intends an alkyl group bound through a single, terminal ether linkage; that is, an "alkoxy" group may be represented as —O-alkyl where alkyl is as defined above. A "lower alkoxy" group intends an alkoxy group having one to six, more specifically one to four, carbon atoms. The term "aryloxy" is used in a similar fashion, with aryl as defined below. The term "hydroxy" refers to —OH.

Similarly, the term "alkylthio" as used herein intends an alkyl group bound through a single, terminal thioether linkage; that is, an "alkylthio" group may be represented as —S-alkyl where alkyl is as defined above. A "lower alkyl thio" group intends an alkyl thio group having one to six, more specifically one to four, carbon atoms. The term "arylthio" is used similarly, with aryl as defined below. The term "thioxy" refers to —SH.

The term "aryl" as used herein, and unless otherwise specified, refers to an aromatic substituent containing a single aromatic ring or multiple aromatic rings that are fused together, linked covalently, or linked to a common group such as a methylene or ethylene moiety. More specific aryl groups contain one aromatic ring or two or three fused or linked aromatic rings, e.g., phenyl, naphthyl, biphenyl, anthracenyl, phenanthrenyl, and the like. In particular embodiments, aryl substituents have 1 to about 200 carbon atoms, typically 1 to about 50 carbon atoms, and specifically 1 to about 20 carbon atoms. "Substituted aryl" refers to an aryl moiety substituted with one or more substituent groups, (e.g., tolyl, mesityl and perfluorophenyl) and the terms "heteroatom-containing aryl" and "heteroaryl" refer to aryl in which at least one carbon atom is replaced with a heteroatom (e.g., rings such as thiophene, pyridine, is zole, pyrazole, pyrrole, furan, oxadiazole, and the like, and/or benzo-fused analogues of these rings are included in the term "heteroaryl"). In some embodiments herein, multi-ring moieties are substituents and in such an embodiment the multi-ring moiety can be attached at an appropriate atom. For example, "naphthyl" can be 1-naphthyl or 2-naphthyl; "anthracenyl" can be 1-anthracenyl, 2-anthracenyl or 9-anthracenyl; and "phenanthrenyl" can be 1-phenanthrenyl, 2-phenanthrenyl, 3-phenanthrenyl, 4-phenanthrenyl or 9-phenanthrenyl.

The term "aralkyl" refers to an alkyl group with an aryl substituent, and the term "aralkylene" refers to an alkylene group with an aryl substituent; the term "alkaryl" refers to an aryl group that has an alkyl substituent, and the term "alkarylene" refers to an arylene group with an alkyl substituent.

The terms "halo" and "halogen" and "halide" are used in the conventional sense to refer to a chloro, bromo, fluoro or iodo substituent. The terms "haloalkyl," "haloalkenyl" or "haloalkynyl" (or "halogenated alkyl," "halogenated alkenyl," or "halogenated alkynyl") refers to an alkyl, alkenyl or alkynyl group, respectively, in which at least one of the hydrogen atoms in the group has been replaced with a halogen atom.

The term "heteroatom-containing" as in a "heteroatom-containing hydrocarbyl group" refers to a molecule or molecular fragment in which one or more carbon atoms is replaced with an atom other than carbon, e.g., nitrogen, oxygen, sulfur, phosphorus, boron or silicon. Similarly, the term "heteroalkyl" refers to an alkyl substituent that is heteroatom-containing, the term "heterocyclic" refers to a cyclic substituent that is heteroatom-containing, the term "heteroaryl" refers to an aryl substituent that is heteroatom-containing, and the like. When the term "heteroatom-containing" appears prior to a list of possible heteroatom-containing groups, it is intended that the term apply to every member of that group. That is, the phrase "heteroatom-containing alkyl, alkenyl and alkynyl" is to be interpreted as "heteroatom-containing alkyl, heteroatom-containing alkenyl and heteroatom-containing alkynyl."

"Hydrocarbyl" refers to hydrocarbyl radicals containing 1 to about 50 carbon atoms, specifically 1 to about 24 carbon atoms, most specifically 1 to about 16 carbon atoms, including branched or unbranched, saturated or unsaturated species, such as alkyl groups, alkenyl groups, aryl groups, and the like. The term "lower hydrocarbyl" intends a hydrocarbyl group of one to six carbon atoms, specifically one to four carbon atoms. "Substituted hydrocarbyl" refers to hydrocarbyl substituted with one or more substituent groups, and the terms "heteroatom-containing hydrocarbyl" and "heterohydrocarbyl" refer to hydrocarbyl in which at least one carbon atom is replaced with a heteroatom.

By "substituted" as in "substituted hydrocarbyl," "substituted aryl," "substituted alkyl," "substituted alkenyl" and the like, as alluded to in some of the aforementioned definitions, is meant that in the hydrocarbyl, hydrocarbylene, alkyl, alkenyl, aryl or other moiety, at least one hydrogen atom bound to a carbon atom is replaced with one or more substituents that are functional groups such as hydroxyl, alkoxy, alkylthio, phosphino, amino, halo, silyl, and the like. When the term "substituted" appears prior to a list of possible substituted groups, it is intended that the term apply to every member of that group. That is, the phrase "substituted alkyl, alkenyl and alkynyl" is to be interpreted as "substituted alkyl, substituted alkenyl and substituted alkynyl." Similarly, "optionally substituted alkyl, alkenyl and alkynyl" is to be interpreted as "optionally substituted alkyl, optionally substituted alkenyl and optionally substituted alkynyl."

By "divalent" as in "divalent hydrocarbyl", "divalent alkyl", "divalent aryl", and the like, is meant that the hydrocarbyl, alkyl, aryl, or other moiety is bonded at two points to atoms, molecules, or moieties with the two bonding points being covalent bonds.

The term "aromatic" is used in its usual sense, including unsaturation that is essentially delocalized across multiple bonds, such as around a ring.

As used herein the term "silyl" refers to the —$SiZ^1Z^2Z^3$ radical, where each of $SiZ^1Z^2Z^3$ is independently selected from the group consisting of hydride and optionally substituted alkyl, alkenyl, alkynyl, heteroatom-containing alkyl, heteroatom-containing alkenyl, heteroatom-containing alkynyl, aryl, heteroaryl, alkoxy, aryloxy, amino, silyl and combinations thereof.

As used herein the term "boryl" refers to the —$BZ^1Z^2$ group, where each of $Z^1$ and $Z^2$ is as defined above. As used herein, the term "phosphino" refers to the group —$PZ^1Z^2$, where each of $Z^1$ and $Z^2$ is as defined above. As used herein, the term "phosphine" refers to the group: $PZ^1Z^2Z^3$, where each of $Z^1$, $Z^2$, $Z^3$ as defined above. The term "amino" is used herein to refer to the group —$NZ^1Z^2$, where each of $Z^1$ and $Z^2$ is as defined above. The term "amine" is used herein to refer to the group: $NZ^1Z^2Z^3$, where each of $Z^1$, $Z^2$, $Z^3$ is as defined above.

The term "saturated" refers to lack of double and triple bonds between atoms of a radical group such as ethyl, cyclohexyl, pyrrolidinyl, and the like. The term "unsaturated" refers to the presence of one or more double and triple bonds between atoms of a radical group such as vinyl, acetylide, oxazolinyl, cyclohexenyl, acetyl and the like.

DETAILED DESCRIPTION

Disclosed herein are catalyst systems useful for the production of polymers. The catalyst system may include one or more catalyst compounds having a nil or negligible hydrogen response. The catalyst system may include one or more biphenyl phenol-containing catalyst compounds having a nil or negligible hydrogen response.

Also disclosed herein are processes to produce polymer compounds using the above described catalyst systems. It has been found that by limiting the number of catalyst compounds in a catalyst system that have a hydrogen response may allow for control of polymer properties that is considerably less complicated and more predictable, as there are fewer independent variables affecting polymerization dynamics (such as multiple catalysts, each having a different hydrogen response).

As used herein, the term "catalyst compound" refers to a metal compound, which when combined with an activator, polymerizes olefins. The term "activator" is used interchangeably with the term "co-catalyst," and the term "catalyst system" refers to a combination of catalyst(s), activator(s), and optionally support material(s). "Mixed catalyst systems," as used herein, refers to catalyst systems containing two or more catalyst compounds, which may include the same or different metals.

The hydrogen response of a catalyst compound in a polymerization process is often judged by the change in mole ratio of hydrogen concentration to monomer (e.g., ethylene) concentration required in the polymerization medium to achieve a certain change in polymer melt index or molecular weight. In a gas phase polymerization process this would be derived from the concentrations of hydrogen and monomer in the gas phase. In a slurry phase polymerization process this would be the derived from the concentrations of hydrogen and monomer in the liquid diluent phase. In a homogeneous solution phase polymerization process this would be derived from the concentrations of hydrogen and monomer in the solution phase.

The polymerization catalyst systems disclosed herein include at least two catalyst compounds, where one or more of the catalyst compounds have essentially no hydrogen response. As used herein, the term "hydrogen response" refers to the reactivity of a catalyst compound with respect to hydrogen. Catalyst compounds exhibiting a hydrogen response will incorporate greater or lesser amounts of hydrogen into the polymer produced as a function of reactor hydrogen concentration. Catalysts exhibiting essentially no hydrogen response, according to embodiments disclosed herein, have a very low, i.e., zero or near zero order, reactivity with respect to hydrogen concentration. In other words, catalysts exhibiting essentially no hydrogen response will react with hydrogen at an essentially constant rate, regardless of reactor hydrogen concentration. One skilled in the art will recognize that GPC measurements for a given polymer sample may vary slightly, and catalysts may be considered to have a near zero order hydrogen response or to react with hydrogen at an essentially constant rate even with some movement in the GPC results. In some embodiments, catalysts may be considered to have essentially no hydrogen response where the weight average molecular weight of the polymer changes by less than 10% when increasing the reactor hydrogen concentration from 0 to 10,000 ppm, such as when analyzing the catalysts using the procedures for conducting ethylene polymerizations in a laboratory gas phase reactor, as detailed below. In other embodiments, catalysts may be considered to have essentially no hydrogen response where the weight average molecular weight of the polymer changes by less than 7.5% when increasing the reactor hydrogen concentration from 0 to 10,000 ppm; more preferably less than 6%; more preferably less than 5%; more preferably less than 4%; more preferably less than 3%; more preferably less than 2%; more preferably less than the GPC test error.

For example, catalyst systems disclosed herein may include a first catalyst compound for producing a high molecular weight polymer fraction and a second catalyst compound for producing a low molecular weight polymer fraction, thus producing a bimodal or multimodal polymer. At least one of the first catalyst compound and the second catalyst compound has essentially no hydrogen response. In some embodiments, the catalyst compound for producing a high molecular weight polymer fraction may have essentially no hydrogen response. In other embodiments, the catalyst compound for producing a low molecular weight polymer fraction may have essentially no hydrogen response. The terms high molecular weight polymer fraction and low molecular weight polymer fraction, as used herein, indicate that the polymer produced by the respective catalyst compound is of a higher or lower molecular weight than the counterpart catalyst compound.

The catalyst systems disclosed herein may allow for production of polymers having bimodal composition distributions in a single reactor. Limiting the number of catalyst compounds in the catalyst system that have a hydrogen response may allow for control of polymer properties that is considerably less complicated and more predictable, as there are fewer independent variables affecting polymerization dynamics (such as a second catalyst having a different hydrogen response).

Polymers produced using the catalysts disclosed herein may have a multimodal molecular weight distribution (Mw/Mn) or, typically, a bimodal molecular weight distribution. In a preferred embodiment, the polymer produced has a density of 0.89 to 0.97 g/cc, an MI ($I_2$) of 0.03-2000 g/10 min, an FI ($I_{21}$) of 1-200 g/10 min, an MFR ($I_{21}/I_2$) of 30-400, an overall Mw of 100,000 to 500,000, an overall Mn of 5,000-60,000 and an Mw/Mn of 10-60.

In some embodiments, the low molecular weight fraction (~500-~50,000) has a density of 0.935-0.975 g/cc and the high molecular weight fraction (50,000-~8,000,000) has a density of 0.910-0.950 g/cc. These polymers are particularly useful for film and pipe, especially, for PE-100 pipe applications.

The molecular weight distributions ("MWDs") of the polymer, as obtained from size exclusion chromatography (SEC), can be deconvoluted using a bimodal fitting program. In some embodiments, the polymer hay have a MWD characteristic such that the preferred split of the polymer, the ratio of Wt % of HMW fraction to the Wt % of LMW fraction, is in the range from 20-80 to 80-20, or in the range from 30-70 to 70-30, or in the range from 40-60 to 60-40.

The SEC curve can be further analyzed to give percent of Wt %>1MM, which is the weight percent of the total MWD that has a molecular weight greater than 1 million, and Wt %>100K, which is the weight perecent of the total MWD that has a molecular weight greater than 100,000. The weight percent ratio ("WPR") is simply Wt %>1MM divided by Wt %>100K. 100,000 was used as an approximate means of dividing the total MWD into a HMW (high molecular weight) and LMW (low molecular weight) region. This ratio gives a simple but sensitive indication of the relative amount of the very high molecular weight species in the HMW region of the MWD. In some embodiments, the polymer has a range of weight percent ratio in the range of from 10 to 30, or in the range of 15 to 25. The WPR may incluence the stability of blown bubble during film extrusion.

In another embodiment, the hydrogen-insensitive catalyst is combined with one or more different catalysts that that have a different ability to incorporate comonomer. In this embodiment, the molecular weight and composition distribution can be controlled by the choice of alternative catalyst(s) and hydrogen/ethylene ratio. The molecular weights of the polymers derived from the hydrogen insensitive catalyst and the other catalyst(s) may be similar or different.

Catalyst Compound with Essentially No $H_2$ Response

Catalyst compounds having essentially no hydrogen response useful in embodiments disclosed herein may include various catalyst compounds comprising a biphenyl phenol compound, either as a ligand or as an electron donor compound to control hydrogen response.

The catalyst compound having essentially no hydrogen response may include a biphenyl phenol complex having the following structure (I):

(I)

where:
M is selected from the group consisting of Ti, Zr, and Hf;
each $R^1$ is substituted with a moiety having the following structure:

(Ia)

the a indicates the location where structure Ia is attached to $R^1$, and the O forms a dative bond with metal M;

each of R² through R⁹ and R¹¹ through R¹⁵ are independently selected from the group consisting of hydride, hydrocarbyl, lower hydrocarbyl, substituted hydrocarbyl, heterohydrocarbyl, alkyl, lower alkyl, substituted alkyl, heteroalkyl, alkenyl, lower alkenyl, substituted alkenyl, heteroalkenyl, alkynyl, lower alkynyl, substituted alkynyl, heteroalkynyl, alkoxy, lower alkoxy, aryloxy, hydroxyl, alkylthio, lower alkyl thio, arylthio, thioxy, aryl, substituted aryl, heteroaryl, aralkyl, aralkylene, alkaryl, alkarylene, haloalkyl, haloalkenyl, haloalkynyl, heteroalkyl, heterocycle, heteroaryl, heteroatom-containing group, silyl, boryl, phosphino, phosphine, amino, and amine; and X is a leaving group.

The two R¹⁵ can also be linked to form a bridging group consisting of optionally substituted divalent hydrocarbyl and divalent heteroatom containing hydrocarbyl. In other embodiments, R¹⁵ is selected from the group consisting of optionally substituted divalent alkyl, divalent lower alkyl, divalent substituted alkyl, divalent heteroalkyl, divalent alkenyl, divalent lower alkenyl, divalent substituted alkenyl, divalent heteroalkenyl, divalent alkynyl, divalent lower alkynyl, divalent substituted alkynyl, divalent heteroalkynyl, divalent alkoxy, divalent lower alkoxy, divalent aryloxy, divalent alkylthio, divalent lower alkyl thio, divalent arylthio, divalent aryl, divalent substituted aryl, divalent heteroaryl, divalent aralkyl, divalent aralkylene, divalent alkaryl, divalent alkarylene, divalent halide, divalent haloalkyl, divalent haloalkenyl, divalent haloalkynyl, divalent heteroalkyl, divalent heterocycle, divalent heteroaryl, divalent heteroatom-containing group, divalent hydrocarbyl, divalent lower hydrocarbyl, divalent substituted hydrocarbyl, divalent heterohydrocarbyl, divalent silyl, divalent boryl, divalent phosphino, divalent phosphine, divalent amino, divalent amine, divalent ether, divalent thioether.

In some embodiments, the catalyst compound having essentially no hydrogen response may include a biphenyl phenol complex having the following structure (II):

(II)

Preparation of Mixed Catalyst System

The catalyst compounds described above comprising a biphenyl phenol compound and having a negligible hydrogen response may be combined with one or more additional catalyst compounds, as described further below, to form a mixed catalyst system or a bimetallic catalyst system. Each of the catalyst compounds may be supported on a common support, may be unsupported, or one or more of the catalyst compounds may be supported or unsupported.

The two or more catalyst compounds can be added together in the desired ratio when combined, contacted with an activator, or contacted with a support or a supported activator. The catalyst compounds may be added to the mixture sequentially or at the same time.

More complex procedures are possible, such as addition of a first catalyst compound to a slurry including a support or a supported activator mixture for a specified reaction time t, followed by the addition of the second catalyst compound solution, mixed for another specified time x, after which the mixture may be recovered for use in a polymerization reactor, such as by spray drying. Lastly, another additive, such as 1-hexene in about 10 vol % can be present in the mixture prior to the addition of the first metal catalyst compound. The catalyst compound having a negligible hydrogen response may be added as the first or second catalyst compound in various embodiments.

The first catalyst compound may be supported via contact with a support material for a reaction time. The resulting supported catalyst composition may then be mixed with mineral oil to form a slurry, which may or may not include an activator. The slurry may then be admixed with a second catalyst compound prior to introduction of the resulting mixed catalyst system to a polymerization reactor. The catalyst compounds may be admixed at any point prior to introduction to the reactor, such as in a polymerization feed vessel or in-line in a catalyst delivery system.

The mixed catalyst system may be formed by combining a HMW catalyst compound (a catalyst compound useful for producing a high molecular weight polymer fraction) with a support and activator, desirably in a first diluent such as an alkane or toluene, to produce a supported, activated HMW catalyst compound. The supported activated HMW catalyst compound, either isolated from the first diluent or not, is then combined in one embodiment with a high viscosity diluent such as mineral or silicon oil, or an alkane diluent comprising from 5 to 99 wt % mineral or silicon oil to form a slurry of the supported HMW catalyst compound, followed by, or simultaneous to combining with a LMW catalyst compound (a catalyst compound useful for producing a low molecular weight polymer fraction), either in a diluent or as the dry solid compound, to form a supported activated mixed catalyst system ("mixed catalyst system"). The mixed catalyst system thus produced may be a supported and activated HMW catalyst compound in a slurry, the slurry comprising mineral or silicon oil, with a LMW catalyst compound that is not supported and not combined with additional activator, where the LMW catalyst compound may or may not be partially or completely soluble in the slurry. In one embodiment, the diluent consists of mineral oil.

Mineral oil, or "high viscosity diluents," as used herein refers to petroleum hydrocarbons and mixtures of hydrocarbons that may include aliphatic, aromatic, and/or paraffinic components that are liquids at 23° C. and above, and typically have a molecular weight of at least 300 amu to 500 amu or more, and a viscosity at 40° C. of from 40 to 300 cSt or greater, or from 50 to 200 cSt in a particular embodiment. The term "mineral oil" includes synthetic oils or liquid polymers, polybutenes, refined naphthenic hydrocarbons, and refined paraffins known in the art, such as disclosed in BLUE BOOK 2001, MATERIALS, COMPOUNDING INGREDIENTS, MACHINERY AND SERVICES FOR RUBBER 189 247 (J. H. Lippincott, D. R. Smith, K. Kish & B. Gordon eds. Lippincott & Peto Inc. 2001). Preferred mineral and silicon oils useful in the present invention are those that exclude moieties that are reactive with metallocene catalysts, examples of which include hydroxyl and carboxyl groups.

The diluent may comprise a blend of a mineral, silicon oil, and/or and a hydrocarbon selected from the group consisting of $C_1$ to $C_{10}$ alkanes, $C_6$ to $C_{20}$ aromatic hydrocarbons, $C_7$ to $C_{21}$ alkyl-substituted hydrocarbons, and mixtures thereof When the diluent is a blend comprising mineral oil, the diluent may comprise from 5 to 99 wt % mineral oil. In some embodiments, the diluent may consist essentially of mineral oil.

In one embodiment, the HMW catalyst compound is combined with an activator and a first diluent to form a catalyst slurry that is then preferably combined with a support material. Until such contact is made, the support particles are preferably not previously activated. The HMW catalyst compound can be in any desirable form such as a dry powder, suspension in a diluent, solution in a diluent, liquid, etc. The catalyst slurry and support particles are then mixed thoroughly, in one embodiment at an elevated temperature, so that both the HMW catalyst compound and the activator are deposited on the support particles to form a support slurry. By following the procedures described herein for forming the mixed catalyst, to provide an activated, supported mixed catalyst system, a polymer, particularly a bimodal polyethylene, can be produced with a desirable combination of density, melt flow ratio and melt strength.

After the HMW catalyst compound and activator are deposited on the support, a LMW catalyst compound may then be combined with the supported HMC, wherein the LMW is combined with a diluent comprising mineral or silicon oil by any suitable means either before, simultaneous to, or after contacting the LMC with the supported HMW catalyst compound. In one embodiment, the HMW catalyst compound is isolated form the first diluent to a dry state before combining with the LMW catalyst compound. Preferably, the LMW catalyst compound is not activated, that is, not combined with any activator, before being combined with the supported HMW catalyst compound. The resulting solids slurry (including both the supported HMW and LMW catalyst compounds) is then preferably mixed thoroughly at an elevated temperature.

A wide range of mixing temperatures may be used at various stages of making the mixed catalyst system. For example, in a specific embodiment, when the HMW catalyst compound and at least one activator, such as methylaluminoxane, are combined with a first diluent to form a mixture, the mixture is preferably heated to a first temperature of from 25° C. to 150° C., preferably from 50° C. to 125° C., more preferably from 75° C. to 100° C., most preferably from 80° C. to 100° C. and stirred for a period of time from 30 seconds to 12 hours, preferably from 1 minute to 6 hours, more preferably from 10 minutes to 4 hours, and most preferably from 30 minutes to 3 hours.

Next, that mixture is preferably combined with a support to provide a first support slurry. The support can be heated, or dehydrated if desired, prior to combining. In one or more embodiments, the first support slurry is mixed at a temperature greater than 50° C., preferably greater than 70° C., more preferably greater than 80° C. and most preferably greater than 85° C., for a period of time from 30 seconds to 12 hours, preferably from 1 minute to 6 hours, more preferably from 10 minutes to 4 hours, and most preferably from 30 minutes to 3 hours. Preferably, the support slurry is mixed for a time sufficient to provide a collection of activated support particles that have the HMW catalyst compound deposited thereto. The first diluent can then be removed from the first support slurry to provide a dried supported HMW catalyst compound. For example, the first diluent can be removed under vacuum or by nitrogen purge.

Next, the LMW catalyst compound is combined with the activated HMW catalyst compound in the presence of a diluent comprising mineral or silicon oil in one embodiment. Preferably, the LMW catalyst compound is added in a molar ratio to the HMW catalyst compound in the range from 2:1 to 1:3. Most preferably, the molar ratio is approximately 1:1. The resultant slurry (or first support slurry) is preferably heated to a first temperature from 25° C. to 150° C., preferably from 50° C. to 125° C., more preferably from 75° C. to 100° C., most preferably from 80° C. to 100° C. and stirred for a period of time from 30 seconds to 12 hours, preferably from 1 minute to 6 hours, more preferably from 10 minutes to 4 hours, and most preferably from 30 minutes to 3 hours.

One or more additional catalysts may be introduced to the dried supported HMW catalyst compound at the same time or at a later time as the LMW catalyst compound is added in one embodiment. Additional activator may also be added in one embodiment. In a particular embodiment, no additional activator is added.

The first diluent is an aromatic or alkane, preferably hydrocarbon diluent having a boiling point of less than 200° C. such as toluene, xylene, hexane, etc., may be removed from the supported HMW catalyst compound under vacuum or by nitrogen purge to provide a supported mixed catalyst system. Even after addition of the oil and/or the LMW (or other) catalyst compound, it may be desirable to treat the slurry to further remove any remaining solvents such as toluene. This can be accomplished by an $N_2$ purge or vacuum, for example. Depending upon the level of mineral oil added, the resultant mixed catalyst system may still be a slurry or may be a free flowing powder that comprises an amount of mineral oil. Thus, the mixed catalyst system, while a slurry of solids in mineral oil in one embodiment, may take any physical form such as a free flowing solid. For example, the mixed catalyst system may ranges from 1 to 99 wt % solids content by weight of the mixed catalyst system (mineral oil, support, all catalyst compounds and activator(s)) in one embodiment.

The molar ratio of the activator to the metal in each of the supported metallocene catalyst compounds is in the range of between 0.3:1 to 1000:1, preferably 20:1 to 800:1, and most preferably 50:1 to 500:1. Where the activator is an ionizing activator such as those based on the anion tetrakis(pentafluorophenyl)borate, the molar ratio of the activator component to the metal component of the metallocene catalyst is preferably in the range of between 0.3:1 to 3:1.

Additional Catalyst Compounds

In combination with the above disclosed catalyst compounds having a nil hydrogen response, any type of polymerization catalyst compound(s) may be used to form the mixed or bimetallic catalyst system, including liquid-form catalysts, solid catalysts, and heterogeneous or supported catalysts, among others, and may be fed to the reactor as a liquid, slurry (liquid/solid mixture), or as a solid (typically gas transported). Such catalyst compounds may be used to form catalyst systems according to embodiments disclosed herein, and/or may be used in addition to catalyst systems according to embodiments disclosed herein for use in producing polymers.

Liquid-form catalysts useful in embodiments disclosed herein should be stable and sprayable or atomizable. These catalysts may be used alone or in various combinations or mixtures. For example, one or more liquid catalysts, one or more solid catalysts, one or more supported catalysts, or a mixture of a liquid catalyst and/or a solid or supported catalyst, or a mixture of solid and supported catalysts may be used. These catalysts may be used with co-catalysts, activators, and/or promoters well known in the art.

Catalyst compounds useful in embodiments disclosed herein may include, broadly, transition metal catalysts and metallocene catalysts. More specifically, catalyst compounds useful in embodiments disclosed herein may include:

A. Ziegler-Natta catalysts, including titanium based catalysts, such as those described in U.S. Pat. Nos. 4,376,062 and 4,379,758. Ziegler-Natta catalysts are well known in the art, and typically are magnesium/titanium/electron donor complexes used in conjunction with an organoaluminum co-catalyst.

B. Chromium based catalysts, such as those described in U.S. Pat. Nos. 3,709,853; 3,709,954; and 4,077,904.

C. Vanadium based catalysts, such as vanadium oxychloride and vanadium acetylacetonate, such as described in U.S. Pat. No. 5,317,036.

D. Metallocene catalysts, such as those described in U.S. Pat. Nos. 6,933,258 and 6,894,131.

E. Cationic forms of metal halides, such as aluminum trihalides.

F. Cobalt catalysts and mixtures thereof, such as those described in U.S. Pat. Nos. 4,472,559 and 4,182,814.

G. Nickel catalysts and mixtures thereof, such as those described in U.S. Pat. Nos. 4,155,880 and 4,102,817.

H. Rare Earth metal catalysts, i.e., those containing a metal having an atomic number in the Periodic Table of 57 to 103, such as compounds of cerium, lanthanum, praseodymium, gadolinium and neodymium. Especially useful are carboxylates, alcoholates, acetylacetonates, halides (including ether and alcohol complexes of neodymium trichloride), and allyl derivatives of such metals. In various embodiments, neodymium compounds, particularly neodymium neodecanoate, octanoate, and versatate, are particularly useful rare earth metal catalysts. Rare earth catalysts may be used, for example, to polymerize butadiene or isoprene.

I. Group 15 atom and metal containing catalysts described in, for example, EP 0 893 454 A1, U.S. Pat. No. 5,889,128 and the references cited in U.S. Pat. No. 5,889,128.

J. Any combination of the above to form a mixed catalyst system.

In some embodiments, a catalyst compound comprising a biphenyl phenol compound and having essentially no hydrogen response, as described above, may be combined with a metallocene to form a catalyst system according to embodiments disclosed herein. Metallocene catalyst compounds are generally described in, for example, 1 & 2 METALLOCENE-BASED POLYOLEFINS (John Scheirs & W. Kaminsky eds., John Wiley & Sons, Ltd. 2000); G. G. Hlalky in 181 COORDINATION CHEM. REV. 243-296 (1999) and in particular, for use in the synthesis of polyethylene in 1 METALLOCENE-BASED POLYOLEFINS 261-377 (2000).

In some embodiments, the metallocene catalyst compounds may include "half sandwich" and "full sandwich" compounds having one or more Cp ligands (cyclopentadienyl and ligands isolobal to cyclopentadienyl) bound to at least one Group 3 to Group 12 metal atom, and one or more leaving group(s) bound to the at least one metal atom. These compounds may also be referred to herein as "metallocenes" or "metallocene catalyst components".

As mentioned above, metallocenes useful in embodiments disclosed herein may include those described in U.S. Pat. Nos. 6,933,258 and 6,894,131. Other useful metallocenes are described in, for example, U.S. Pat. Nos. 7,582,711, 5,017,714, 5,055,438, 5,096,867, 5,198,401, 5,229,478, 5,264,405, 5,278,119, 5,324,800, 5,384,299, 5,408,017, 5,491,207, 5,580,939, 5,621,126, 6,207,606, 6,245,868, 6,300,436, 6,306,984, 6,391,819, 6,472,342, 6,492,472, 6,605,560, 6,608,153, 6,734,267, 6,936,226, and 6,943,134.

Preferred metallocenes may be represented by the following structures (III, IV, V, VI, VII):

(III)

(IV)

(V)

(VI)

(VII)

In some embodiments, a catalyst compound comprising a biphenyl phenol compound and having essentially no hydrogen response may be combined with a Group 15 atom and metal containing catalyst compound to form a catalyst system according to embodiments disclosed herein.

"Group 15 Atom and Metal Containing Catalyst" or "Group 15-containing catalyst compound, or "Group 15-containing catalyst components," as used interchangeably and referred to herein, include Group 3 to Group 12 metal complexes, where the metal is 2 to 4 coordinate, and the coordinating moiety or moieties include at least two Group 15 atoms, and up to four Group 15 atoms. In one embodiment, the Group 15-containing catalyst component is a complex of a Group 4 metal and from one to four ligands such that the Group 4 metal is at least 2 coordinate, the coordinating moiety or moieties including at least two nitrogens. Representative Group 15-containing catalyst compounds are disclosed in, for example, WO 98/46651, WO 99/01460; EP A1 0 893,454; EP A1 0 894 005; and U.S. Pat. Nos. 5,318,935, 5,889,128, 6,333,389, 6,271,325, 6,274,684, 6,300,438, 6,482,904, and 6,858,689. In some embodiments, the Group 15-containing catalyst may include at least one fluoride or fluorine containing leaving group.

In some embodiments, the Group 15 containing metal catalyst compound, may be represented by the structure (VIII) or (IX):

wherein: M is a Group 3 to 12 transition metal or a Group 13 or 14 main group metal, preferably a Group 4, 5, or 6 metal, and more preferably a Group 4 metal, and most preferably zirconium, titanium or hafnium; each X is independently a leaving group, preferably, an anionic leaving group, and more preferably hydrogen, a hydrocarbyl group, a heteroatom or a halogen, and most preferably an alkyl; y is 0 or 1 (when y is 0 group L' is absent); n is the oxidation state of M, preferably +3, +4, or +5, and more preferably +4; m is the formal charge of the YLZ or the YL'Z ligand, preferably 0, −1, −2 or −3, and more preferably −2; L is a Group 15 or 16 element, preferably nitrogen; L' is a Group 15 or 16 element or Group 14 containing group, preferably carbon, silicon or germanium; Y is a Group 15 element, preferably nitrogen or phosphorus, and more preferably nitrogen; Z is a Group 15 element, preferably nitrogen or phosphorus, and more preferably nitrogen; $R^1$ and $R^2$ are independently a $C_1$ to $C_1$ hydrocarbon group, a heteroatom containing group having up to twenty carbon atoms, silicon, germanium, tin, lead, or phosphorus, preferably a $C_2$ to $C_{20}$ alkyl, aryl or aralkyl group, more preferably a linear, branched or cyclic $C_2$ to $C_{20}$ alkyl group, most preferably a $C_2$ to $C_6$ hydrocarbon group; $R^3$ is absent or a hydrocarbon group, hydrogen, a halogen, a heteroatom containing group, preferably a linear, cyclic or branched alkyl group having 1 to 20 carbon atoms, more preferably $R^3$ is absent, hydrogen or an alkyl group, and most preferably hydrogen; $R^4$ and $R^5$ are independently an alkyl group, an aryl group, substituted aryl group, a cyclic alkyl group, a substituted cyclic alkyl group, a cyclic aralkyl group, a substituted cyclic aralkyl group or multiple ring system, preferably having up to 20 carbon atoms, more preferably between 3 and 10 carbon atoms, and even more preferably a $C_1$ to $C_{20}$ hydrocarbon group, a $C_1$ to $C_{20}$ aryl group or a $C_1$ to $C_{20}$ aralkyl group, or a heteroatom containing group, for example $PR_3$, where R is an alkyl group, $R^1$ and $R^2$ may be interconnected to each other, and/or $R^4$ and $R^5$ may be interconnected to each other; $R^6$ and $R^2$ are independently absent, or hydrogen, an alkyl group, halogen, heteroatom or a hydrocarbyl group, preferably a linear, cyclic or branched alkyl group having 1 to 20 carbon atoms, more preferably absent; and $R^*$ is absent, or is hydrogen, a Group 14 atom containing group, a halogen, a heteroatom containing group.

By "formal charge of the YLZ or YL'Z ligand" it is meant the charge of the entire ligand absent the metal and the leaving groups X.

By "$R^1$ and $R^2$ may also be interconnected" it is meant that $R^1$ and $R^2$ may be directly bound to each other or may be bound to each other through other groups. By "$R^4$ and $R^5$ may also be interconnected" it is meant that $R^4$ and $R^5$ may be directly bound to each other or may be bound to each other through other groups.

An alkyl group may be a linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof An aralkyl group is defined to be a substituted aryl group.

In some embodiment $R^4$ and $R^5$ are independently a group represented by the following structure (X):

wherein $R^8$ to $R^{12}$ are each independently hydrogen, a $C_1$ to $C_{40}$ alkyl group, a halide, a heteroatom, a heteroatom containing group containing up to 40 carbon atoms, preferably a $C_1$ to $C_{20}$ linear or branched alkyl group, preferably a methyl, ethyl, propyl or butyl group, any two R groups may form a cyclic group and/or a heterocyclic group. The cyclic groups may be aromatic. In a preferred embodiment $R^9$, $R^{10}$ and $R^{12}$ are independently a methyl, ethyl, propyl or butyl group (including all isomers), in a preferred embodiment $R^9$, $R^{10}$ and $R^{12}$ are methyl groups, and $R^8$ and $R^{11}$ are hydrogen.

In some embodiments, $R^4$ and $R^5$ are both a group represented by the following structure (XI):

In this embodiment, M is a Group 4 metal, preferably zirconium, titanium or hafnium, and even more preferably zirconium; each of L, Y, and Z is nitrogen; each of $R^1$ and $R^2$ is —$CH_2$—$CH_2$—; $R^3$ is hydrogen; and $R^6$ and $R^7$ are absent.

Preferred group 15-containing catalyst compounds may be represented by the following structures (XII):

(XII)

Catalyst systems containing two or more catalyst compounds, including a biphenyl phenol-containing catalyst compound having essentially no hydrogen response in combination with one or more additional catalyst compounds as described above, may be used for producing polyolefins having essentially unimodal, bimodal or multimodal molecular weight distributions.

Catalyst systems disclosed herein may include (i) a biphenyl phenol-containing catalyst compound having essentially no hydrogen response, and (ii) at least one of a metallocene catalyst compound and a Group 15-containing catalyst compound.

For example, catalyst systems disclosed herein may include (i) a biphenyl phenol-containing catalyst compound having essentially no hydrogen response as represented by structure (I) or (II), and (ii) at least one metallocene catalyst compound represented by structures (III), (IV), (V), (VI), or (VII). In other embodiments, the catalyst systems may include (i) an biphenyl phenol-containing catalyst compound having essentially no hydrogen response as represented by structure (I) or (II), and (ii) at least one Group 15-containing catalyst compound, such as may be represented by any one of structures (VIII)-(XII), preferably structure (XII).

Catalyst systems disclosed herein may include (i) an biphenyl phenol-containing catalyst compound having essentially no hydrogen response as represented by structure (I) or (II), (ii) at least one metallocene catalyst compound represented by structures (III), (IV), (V), (VI), (VII) and a Group 15-containing catalyst compound, such as may be represented by any one of structures (VIII)-(XII), preferably structure (XII).

Activators

The polymerization catalyst compounds, prepared above, are typically combined with an activator compound to yield compounds having a vacant coordination site that will coordinate, insert, and polymerize olefin(s). For the purposes of embodiments disclosed herein and appended claims, the term "activator" is defined to be any compound which can activate any one of the catalyst compounds described above by converting the neutral catalyst compound to a catalytically active catalyst compound cation. Non-limiting activators include alumoxanes, aluminum alkyls, ionizing activators, which may be neutral or ionic, and conventional-type cocatalysts. Suitable activators are disclosed in U.S. Patent Application Publication No. 2008/045676.

Support Materials

The polymerization catalyst compounds disclosed herein may be combined with a support material or carrier, or with a supported activator. For example, the catalyst compound is deposited on, contacted with, vaporized with, bonded to, or incorporated within, adsorbed or absorbed in, or on, a support or carrier.

The support material is any of the conventional support materials. Preferably the supported material is a porous support material, for example, talc, inorganic oxides and inorganic chlorides. Other support materials include resinous support materials such as polystyrene, functionalized or crosslinked organic supports, such as polystyrene divinyl benzene polyolefins or polymeric compounds, zeolites, clays, or any other organic or inorganic support material and the like, or mixtures thereof The preferred support materials are inorganic oxides that include those Group 2, 3, 4, 5, 13 or 14 metal oxides. The preferred supports include silica, fumed silica, alumina (WO 99/60033), silica-alumina and mixtures thereof Other useful supports include magnesia, titania, zirconia, magnesium chloride (U.S. Pat. No. 5,965,477), montmorillonite (European Patent EP-B1 0 511 665), phyllosilicate, zeolites, talc, and clays (U.S. Pat. No. 6,034,187). Also, combinations of these support materials may be used, for example, silica-chromium, silica-alumina, silica-titania, and the like. Additional support materials may include those porous acrylic polymers described in EP 0 767 184 B1. Other support materials include nanocomposites as described in PCT WO 99/47598, aerogels as described in WO 99/48605, spherulites as described in U.S. Pat. No. 5,972,510, and polymeric beads as described in WO 99/50311. A preferred support is fumed silica which is typically a silica with particles 7 to 30 nanometers in size that has been treated with dimethylsilyldichloride such that a majority of the surface hydroxyl groups are capped.

The support material may have a surface area in the range of from about 10 to about 700 $m^2/g$, or in the range of from about 50 to about 1000 $m^2/g$, or in the range is from about 100 to about 400 $m^2/g$, or in the range of about 200 to about 600 $m^2/g$, or in the range of about 245 to about 375 $m^2/g$, or in the range of 410 to about 620 $m^2/g$, or in the range of about 390 to about 590 $m^2/g$.

The support material may have a pore volume in the range of from about 0.1 to about 4.0 cc/g, or from about 0.5 to about 3.5 cc/g, or from about 0.8 to about 3.0 cc/g. In some embodiments, the support material may have a pore volume in the range of from 0.5 to about 6.0 cc/g, or from about 1.1 to about 1.8 cc/g, or from about 2.4 to about 3.7 cc/g, or from about 0.9 to about 1.4 cc/g.

The support material may have an average particle size in the range of from about 5 to about 500 microns, or from about 10 to about 300 microns, or from about 5 to about 100 microns.

It is preferred that the support material, most preferably an inorganic oxide, has a surface area in the range of from about 10 to about 700 $m^2/g$, pore volume in the range of from about 0.1 to about 4.0 cc/g and average particle size in the range of from about 5 to about 500 microns. More preferably, the surface area of the support material is in the range of from about 50 to about 1000 $m^2/g$, pore volume of from about 0.5 to about 3.5 cc/g and average particle size of from about 10 to about 300 microns. Most preferably the surface area of the support material is in the range from about 100 to about 400 $m^2/g$, pore volume from about 0.8 to about 3.0 cc/g and average particle size is from about 5 to about 100 microns. In some embodiments, the support may have a pore volume of about 0.5 to about 6.0 cm³/g and a surface area of about 200 to about 600 m²/g. In other embodiments, the support may have a pore volume of about 1.1 to about 1.8 cm³/g and a surface area of about 245 to about 375 m²/g. In some other embodiments, the support may have a pore volume of about 2.4 to about 3.7 cm³/g and a surface area of about 410 to about 620 m²/g. In yet other embodiments, the support may have a pore volume of about 0.9 to about 1.4 cm³/g and a surface area of about 390 to about 590 m²/g. Each of the above properties may be measured using conventional techniques as known in the art.

In another embodiment, the support and activator may be as described in US2009240010A1, WO2009117128A1, WO2009045215, US2007197716, and/or US2005288178.

In some embodiments, the support and activator are a combination of a fluorided alumina-silica and an alkyl aluminum or alkylaluminoxane.

Polymerization Process

Embodiments for producing polyolefin polymer may employ any suitable process for the polymerization of olefins, including any suspension, solution, slurry, or gas phase process, using known equipment and reaction conditions, and are not limited to any specific type of polymerization system. Generally, olefin polymerization temperatures may range from about 0 to about 300° C. at atmospheric, sub-atmospheric, or super-atmospheric pressures. In particular, slurry or solution polymerization systems may employ sub-atmospheric, or alternatively, super-atmospheric pressures, and temperatures in the range of about 40 to about 300° C.

IN some embodiments, liquid phase polymerization systems such as those described in U.S. Pat. No. 3,324,095, may be used. Liquid phase polymerization systems generally comprise a reactor to which olefin monomers and catalyst compositions are added. The reactor contains a liquid reaction medium which may dissolve or suspend the polyolefin product. This liquid reaction medium may comprise an inert liquid hydrocarbon which is non-reactive under the polymerization conditions employed, the bulk liquid monomer, or a mixture thereof Although such an inert liquid hydrocarbon may not function as a solvent for the catalyst composition or the polymer obtained by the process, it usually serves as solvent for the monomers used in the polymerization. Inert liquid hydrocarbons suitable for this purpose may include isobutane, isopentane, hexane, cyclohexane, heptane, octane, benzene, toluene, and mixtures and isomers thereof Reactive contact between the olefin monomer and the catalyst composition may be maintained by constant stirring or agitation. The liquid reaction medium which contains the olefin polymer product and unreacted olefin monomer is withdrawn from the reactor continuously. The olefin polymer product is separated, and the unreacted olefin monomer and liquid reaction medium are typically recycled and fed back into the reactor.

Embodiments for producing polyolefin polymer disclosed herein may also employ a gas phase polymerization process utilizing a fluidized bed reactor. This type reactor, and means for operating the reactor, are well known and are described in, for example, U.S. Pat. Nos. 3,709,853; 4,003,712; 4,011,382; 4,302,566; 4,543,399; 4,882,400; 5,352,749; 5,541,270; and EP-A-0 802 202. These patents disclose gas phase polymerization processes wherein the polymerization medium is either mechanically agitated or fluidized by the continuous flow of the gaseous monomer and diluent.

Other gas phase processes contemplated by the process of the invention include series or multistage polymerization processes. Also gas phase processes contemplated by the invention include those described in U.S. Pat. Nos. 5,627,242, 5,665,818 and 5,677,375, and European publications EP-A-0 794 200 EP-B1-0 649 992, EP-A-0 802 202 and EP-B-634 421.

In general, the polymerization process of the present invention may be a continuous gas phase process, such as a fluid bed process. A fluid bed reactor for use in the process of the present invention typically has a reaction zone and a so-called velocity reduction zone (disengagement zone). The reaction zone includes a bed of growing polymer particles, formed polymer particles and a minor amount of catalyst particles fluidized by the continuous flow of the gaseous monomer and diluent to remove heat of polymerization through the reaction zone. Optionally, some of the recirculated gases may be cooled and compressed to form liquids that increase the heat removal capacity of the circulating gas stream when readmitted to the reaction zone. A suitable rate of gas flow may be readily determined by simple experiment. Makeup of gaseous monomer to the circulating gas stream is at a rate equal to the rate at which particulate polymer product and monomer associated therewith is withdrawn from the reactor, and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may be removed in a cyclone and/or fine filter. The gas is passed through a heat exchanger wherein the heat of polymerization is removed, compressed in a compressor and then returned to the reaction zone.

The process is suitable for the production of homopolymers of olefins, including ethylene, and/or copolymers, terpolymers, and the like, of olefins, including polymers comprising ethylene and at least one or more other olefins. The olefins may be alpha-olefins. The olefins, for example, may contain from 2 to 16 carbon atoms in one embodiment. The polymer may comprise ethylene and a comonomer comprising from 3 to 12 carbon atoms, or from 4 to 10 carbon atoms, or from 4 to 8 carbon atoms.

In embodiments, polyethylenes may be prepared by the process disclosed herein. Such polyethylenes may include homopolymers of ethylene and interpolymers of ethylene and at least one alpha-olefin wherein the ethylene content is at least about 50% by weight of the total monomers involved. Olefins that may be used herein include ethylene, propylene, 1-butene, 1-pentene, 1-hexene, 1-heptene, 1-octene, 4-methylpent-1-ene, 1-decene, 1-dodecene, 1-hexadecene and the like. Also usable are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene, and olefins formed in situ in the polymerization medium. When olefins are formed in situ in the polymerization medium, the formation of polyolefins containing long chain branching may occur.

Other monomers useful in the process described herein include ethylenically unsaturated monomers, diolefins having 4 to 18 carbon atoms, conjugated or non-conjugated dienes, polyenes, vinyl monomers and cyclic olefins. Non-limiting monomers useful in the invention may include norbornene, norbornadiene, isobutylene, isoprene, vinylbenzocyclobutane, styrenes, alkyl substituted styrene, ethylidene norbornene, dicyclopentadiene and cyclopentene. In another embodiment of the process described herein, ethylene or propylene may be polymerized with at least two different comonomers, optionally one of which may be a diene, to form a terpolymer.

In one embodiment, the content of the alpha-olefin incorporated into the copolymer may be no greater than 30 mol % in total; from 3 to 20 mol % in other embodiments. The term "polyethylene" when used herein is used generically to refer to any or all of the polymers comprising ethylene described above.

In another family of embodiments, propylene-based polymers may be prepared by processes disclosed herein. Such propylene-based polymers may include homopolymers of propylene and interpolymers of propylene and at least one alpha-olefin wherein the propylene content is at least about 50% by weight of the total monomers involved. Comonomers that may be used may include ethylene, 1-butene, 1-pentene, 1-hexene, 1-heptene, 1-octene, 4-methylpentene-1,1-decene, 1-dodecene, 1-hexadecene and the like. Also usable are polyenes such as 1,3-hexadiene, 1,4-hexadiene, cyclopentadiene, dicyclopentadiene, 4-vinylcyclohexene-1,1,5-cyclooctadiene, 5-vinylidene-2-norbornene and 5-vinyl-2-norbornene, and olefins formed in situ in the polymerization medium. When olefins are formed in situ in the polymerization medium, the formation of polyolefins containing long chain branching may occur. In one embodiment, the content of the alpha-olefin comonomer incorporated into a propylene-based polymer may be no greater than 49 mol % in total; or from 3 to 35 mol % in other embodiments.

Hydrogen gas is often used in olefin polymerization to control the final properties of the polyolefin. Using the catalyst system described herein, it is known that increasing the concentration (partial pressure) of hydrogen may increase the melt flow index (MFI) and/or melt index (MI) of the polyolefin generated. The MFI or MI can thus be influenced by the hydrogen concentration. The amount of hydrogen in the polymerization can be expressed as a mole ratio relative to the total polymerizable monomer, for example, ethylene, or a blend of ethylene and hexene or propylene. The amount of hydrogen used in the polymerization processes of the present invention is an amount necessary to achieve the desired MFI or MI of the final polyolefin resin.

The one or more reactors in a gas phase or fluidized bed polymerization process may have a pressure ranging from about 0.7 to about 70 bar (about 10 to 1000 psia), or from about 14 to about 42 bar (about 200 to about 600 psia). The one or more reactors may have a temperature ranging from about 10° C. to about 150° C., or from about 40° C. to about 125° C. In one embodiment, the reactor temperature may be operated at the highest feasible temperature taking into account the sintering temperature of the polymer within the reactor. The superficial gas velocity in the one or more reactors may range from about 0.2 to 1.1 meters/second (0.7 to 3.5 feet/second), or from about 0.3 to 0.8 meters/second (1.0 to 2.7 feet/second).

In some embodiments, the polymerization process is a continuous gas phase process that includes the steps of: (a) introducing a recycle stream (including ethylene and alpha olefin monomers) into the reactor; (b) introducing the supported catalyst system; (c) withdrawing the recycle stream from the reactor; (d) cooling the recycle stream; (e) introducing into the reactor additional monomer(s) to replace the monomer(s) polymerized; (f) reintroducing the recycle stream or a portion thereof into the reactor; and (g) withdrawing a polymer product from the reactor.

In some embodiments, one or more olefins, $C_2$ to $C_{30}$ olefins or alpha-olefins, including ethylene or propylene or combinations thereof, may be prepolymerized in the presence of the catalyst systems described above prior to the main polymerization. The prepolymerization may be carried out batch-wise or continuously in gas, solution or slurry phase, including at elevated pressures. The prepolymerization can take place with any olefin monomer or combination and/or in the presence of any molecular weight controlling agent such as hydrogen. For examples of prepolymerization procedures, see U.S. Pat. Nos. 4,748,221, 4,789,359, 4,923,833, 4,921, 825, 5,283,278 and 5,705,578 and European publication EP-B-0279 863 and WO 97/44371.

The present invention is not limited to any specific type of fluidized or gas phase polymerization reaction and can be carried out in a single reactor or multiple reactors such as two or more reactors in series. In addition to well-known conventional gas phase polymerization processes, it is within the scope of the present invention that "condensing mode," including the "induced condensing mode" and "liquid monomer" operation of a gas phase polymerization may be used.

For example, the process may employ a condensing mode polymerization, such as those disclosed in U.S. Pat. Nos. 4,543,399; 4,588,790; 4,994,534; 5,352,749; 5,462,999; and 6,489,408, and U.S. Patent Application Publication No. 2008/0045676. Condensing mode processes may be used to achieve higher cooling capacities and, hence, higher reactor productivity. In addition to condensable fluids of the polymerization process itself, other condensable fluids inert to the polymerization may be introduced to induce a condensing mode operation, such as by the processes described in U.S. Pat. No. 5,436,304.

Other embodiments of the preset invention may also use a liquid monomer polymerization mode such as those disclosed in U.S. Pat. No. 5,453,471; PCT 95/09826 and PCT 95/09827. When operating in the liquid monomer mode, liquid can be present throughout the entire polymer bed provided that the liquid monomer present in the bed is adsorbed on or in solid particulate matter present in the bed, such as polymer being produced or inert particulate material (e.g., carbon black, silica, clay, talc, and mixtures thereof), so long as there is no substantial amount of free liquid monomer present. Operating in a liquid monomer mode may also make it possible to produce polymers in a gas phase reactor using monomers having condensation temperatures much higher than the temperatures at which conventional polyolefins are produced.

Processes disclosed herein may optionally use inert particulate materials as fluidization aids. These inert particulate materials can include carbon black, silica, talc, and clays, as well as inert polymeric materials. Carbon black, for example, has a primary particle size of about 10 to about 100 nanometers, an average size of aggregate of about 0.1 to about 30 microns, and a specific surface area from about 30 to about 1500 $m^2/g$. Silica has a primary particle size of about 5 to about 50 nanometers, an average size of aggregate of about 0.1 to about 30 microns, and a specific surface area from about 50 to about 500 $m^2/g$. Clay, talc, and polymeric materials have an average particle size of about 0.01 to about 10 microns and a specific surface area of about 3 to 30 $m^2/g$. These inert particulate materials may be used in amounts ranging from about 0.3 to about 80% in some embodiments, and from about 5 to about 50% in other embodiments, based on the weight of the final product. They are especially useful for the polymerization of sticky polymers as disclosed in U.S. Pat. Nos. 4,994,534 and 5,304,588.

Chain transfer agents, promoters, scavenging agents and other additives may be, and often are, used in the polymerization processes disclosed herein. Chain transfer agents are often used to control polymer molecular weight. Examples of these compounds are hydrogen and metal alkyls of the general formula $M^xR_y$, where M is a Group 3-12 metal, x is the oxidation state of the metal, typically 1, 2, 3, 4, 5 or 6, each R is independently an alkyl or aryl, and y is 0, 1, 2, 3, 4, 5, or 6. In some embodiments, a zinc alkyl is used, such as diethyl zinc. Typical promoters may include halogenated hydrocarbons such as $CHCl_3$, $CFCl_3$, $CH_3$—$CCl_3$, $CF_2Cl\ CCl_3$, and ethyltrichloroacetate. Such promoters are well known to those skilled in the art and are disclosed in, for example, U.S. Pat. No. 4,988,783. Other organometallic compounds such as scavenging agents for poisons may also be used to increase catalyst activity. Examples of these compounds include metal alkyls, such as aluminum alkyls, for example, triisobutylaluminum. Some compounds may be used to neutralize static in the fluidized-bed reactor, others known as drivers rather than antistatic agents, may consistently force the static from positive to negative or from negative to positive. The use of these additives is well within the skill of those skilled in the art. These additives may be added to the circulation loops, riser, and/or downer separately or independently from the liquid catalyst if they are solids, or as part of the catalyst provided they do not interfere with the desired atomization. To be part of the catalyst solution, the additives should be liquids or capable of being dissolved in the catalyst solution.

In one embodiment, the gas phase process may be operated in the presence of a metallocene-type catalyst system and in the absence of, or essentially free of, any scavengers, such as triethylaluminum, trimethylaluminum, tri-isobutylaluminum and tri-n-hexylaluminum and diethyl aluminum chloride, dibutyl zinc, and the like. By "essentially free," it is meant that these compounds are not deliberately added to the reactor or any reactor components, and if present, are present in the reactor at less than 1 ppm.

In a family of embodiments, the reactors disclosed herein are capable of producing greater than 500 lbs of polymer per hour (227 Kg/hr) to about 220,000 lbs/hr (100,000 kg/hr) or higher of polymer, preferably greater than 1000 lbs/hr (455 kg/hr), more preferably greater than 10,000 lbs/hr (4540 kg/hr), more preferably greater than 25,000 lbs/hr (11,300 kg/hr), more preferably greater than 35,000 lbs/hr (15,900 kg/hr), more preferably greater than 50,000 lbs/hr (22,700 Kg/hr) and more preferably greater than 65,000 lbs/hr (29,000 kg/hr) to greater than 100,000 lbs/hr (45,500 kg/hr).

The polymers produced by the processes described herein can be used in a wide variety of products and end-use applications. The polymers produced may include linear low density polyethylene, elastomers, plastomers, high density polyethylenes, medium density polyethylenes, low density polyethylenes, polypropylene homopolymers and polypropylene copolymers, including random copolymers and impact copolymers.

The polymers, typically ethylene based polymers, have a density in the range of from 0.86 g/cc to 0.97 g/cc, preferably in the range of from 0.88 g/cc to 0.965 g/cc, more preferably in the range of from 0.900 g/cc to 0.96 g/cc, more preferably in the range of from 0.905 g/cc to 0.95 g/cc, more preferably in the range from 0.910 g/cc to 0.940 g/cc, and most preferably greater than 0.915 g/cc, preferably greater than 0.920 g/cc, and most preferably greater than 0.925 g/cc. Density is measured in accordance with ASTM-D-1238.

In yet another embodiment, propylene based polymers are produced according to embodiments disclosed herein. These polymers include atactic polypropylene, isotactic polypropylene, hemi-isotactic and syndiotactic polypropylene. Other propylene polymers include propylene block, random, or impact copolymers. Propylene polymers of these types are well known in the art; see U.S. Pat. Nos. 4,794,096, 3,248,455, 4,376,851, 5,036,034 and 5,459,117.

The polymers may be blended and/or coextruded with any other polymer. Non-limiting examples of other polymers include linear low density polyethylenes produced via conventional Ziegler-Natta and/or bulky ligand metallocene catalysis, elastomers, plastomers, high pressure low density polyethylene, high density polyethylenes, polypropylenes, and the like.

Polymers produced by the processes disclosed herein and blends thereof are useful in such forming operations as film, sheet, and fiber extrusion and co-extrusion as well as blow molding, injection molding and rotary molding. Films include blown or cast films formed by co-extrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, pipe, geomembranes, and pond liners. Molded articles include single and multi-layered constructions in the form of bottles, tanks, large hollow articles, rigid food containers and toys, etc.

Continuity Additives/Static Control Agents

In processes disclosed herein, it may also be desired to additionally use one or more static control agents to aid in regulating static levels in the reactor. As used herein, a static control agent is a chemical composition which, when introduced into a fluidized bed reactor, may influence or drive the static charge (negatively, positively, or to zero) in the fluidized bed. The specific static control agent used may depend upon the nature of the static charge, and the choice of static control agent may vary dependent upon the polymer being produced and the catalyst being used. For example, the use of static control agents is disclosed in European Patent No. 0229368 and U.S. Pat. Nos. 4,803,251, 4,555,370, and 5,283,278, and references cited therein.

The static control agent used may be selected for its ability to receive the static charge in the fluidized bed without adversely affecting productivity. Suitable static control agents may include aluminum stearate, aluminum distearate, ethoxlated amines, and anti-static compositions such as those provided by Innospec Inc. under the trade name OCTASTAT. For example, OCTASTAT 2000 is a mixture of a polysulfone copolymer, a polymeric polyamine, and oil-soluble sulfonic acid.

Any of the aforementioned control agents, as well as those described in, for example, WO 01/44322, listed under the heading Carboxylate Metal Salt and including those chemicals and compositions listed as antistatic agents may be employed either alone or in combination as a control agent. For example, the carboxylate metal salt may be combined with an amine containing control agent (e.g., a carboxylate metal salt with any family member belonging to the KEMAMINE (available from Crompton Corporation) or ATMER (available from ICI Americas Inc.) family of products).

Other useful static control agents and continuity additives are disclosed in U.S. Patent Application Publication No. 2008/0045663.

The continuity additive(s) or static control agent(s) may be added to the reactor in an amount ranging from 0.05 to 200 ppm, based on the weight of all feeds to the reactor, excluding recycle, more preferably in an amount ranging from 2 to 100 ppm; more preferably from 4 to 50 ppm in yet other embodiments.

EXAMPLES

The procedure for preparing silica supported methylalumoxane (SMAO) used is according to that disclosed in U.S. Pat. No. 7,220,804 B1.

The procedure for preparing supported catalyst in oil slurry form is as follows: transition metal compounds in their original form were first mixed with KAYDOL oil. SMAO was then added to this mixture and the resulting slurry was rolled at room temperature overnight. In most cases studied, this mixing time was sufficient to produce a fully activated catalyst ready to be used for polymerization. Typical Al/TM (Transition Metal) ratios used for the resulting slurry catalysts range from 50-150 and solid catalyst contents in KAYDOL oil is around 5-15%. For laboratory gas phase polymerization study, 5 grams of SMAO (4.5 mmol Al/g silica) was normally employed as scavenger.

Ethylene polymerization was conducted in a laboratory gas phase reactor. The gas phase reactor employed was a 1.65 liter, stainless steel autoclave equipped with a variable speed mechanical agitator. For maximum mixing, the reactor was normally operated at a 45 degree angle from its vertical position during polymerization. In a standard HDPE run, the reactor was first charged with 400 g of NaCl and dried by heating at 95° C. under stream of Nitrogen for an hour. After baking out the reactor, the temperature is lowered to 60° C. to introduce 5 g of SMAO (silica supported methylalumoxane) as a scavenger with help of nitrogen pressure. After adding SMAO, the reactor was sealed and components were gently stirred. The reactor was then charged with hydrogen (3,000 ppm) and 1-hexene (C6/C2=0.003 to 0.007). The reactor is then pressurized with 1.62 MPa (220 psig) of ethylene. Once the system reaches a steady state, catalyst is charged into the reactor using a stainless steel bomb to start polymerization. The reactor temperature is then brought up to the specified temperature (85° C. or 100° C.) and maintained at this temperature through the run. The polymerization was typically carried out for 60 minutes and during this time C6/C2 ratio and ethylene pressure remained constant. At the end of 60 minutes, the reactor is cooled down, vented and opened. The resulting mixture is then washed with water, methanol and dried.

Molecular weight (Mw and Mn) were measured by gel permeation chromatography on a Waters 150oC. GPC instrument equipped with differential refraction index detectors. The GPC columns were calibrated by running a series of molecular weight standards and the molecular weights were calculated using Mark Houwink coefficients for the polymer in question.

Description and structure of catalysts used in the Examples:

Catalyst A: Bis(n-butylcyclopentadienyl)zirconium dichloride, obtained from Boulder Scientific Company, Boulder, Colo.

Catalyst B: (Tetramethylcyclopentadienyl)(n-propylcyclopentadienyl) zirconium dichloride, obtained from Boulder Scientific Company, Boulder, Colo.

Catalyst C: Group-15 containing triamino complex, obtained from Boulder Scientific Company, Boulder, Colo.

Catalyst D: Biphenyl phenol complex, obtained from Symyx Technologies, Santa Clara, Calif.

The structures of Catalysts A-D are represented below.

Catalyst A

Catalyst B

Catalyst C

Catalyst D

Table 1 shows the molecular weight response (Mw) of the component catalysts under different level of $H_2$.

TABLE 1

Catalyst Component Hydrogen Response

| Example | Catalyst | Mw (0 ppm $H_2$) | Mw (3,000 ppm $H_2$) | Mw (10,000 ppm $H_2$) |
|---|---|---|---|---|
| 1 | A | 66,664 | 20,462 | |
| 2 | B | 146,255 | 20,288 | |
| 3 | C | 759,822 | | 160,160 |
| 4 | D | 343,511 | | 321,487 |

As shown from Table 1, Catalyst Component D exhibited no or very low Mw movement over a wide range of hydrogen ($H_2$). In contrast, comparative Catalyst Compounds A, B, and C showed a large Mw movement over the range of hydrogen.

Various combinations of LMW and HMW catalysts (catalyst pairs) were tested for bimodal applications, where the catalyst pairs are listed in Table 2.

TABLE 2

Mixed Catalyst Systems

| Catalyst Pair | LMW Component | HMW Component |
|---|---|---|
| I | Catalyst A | Catalyst D |
| II | Catalyst B | Catalyst C |

Figure 1:
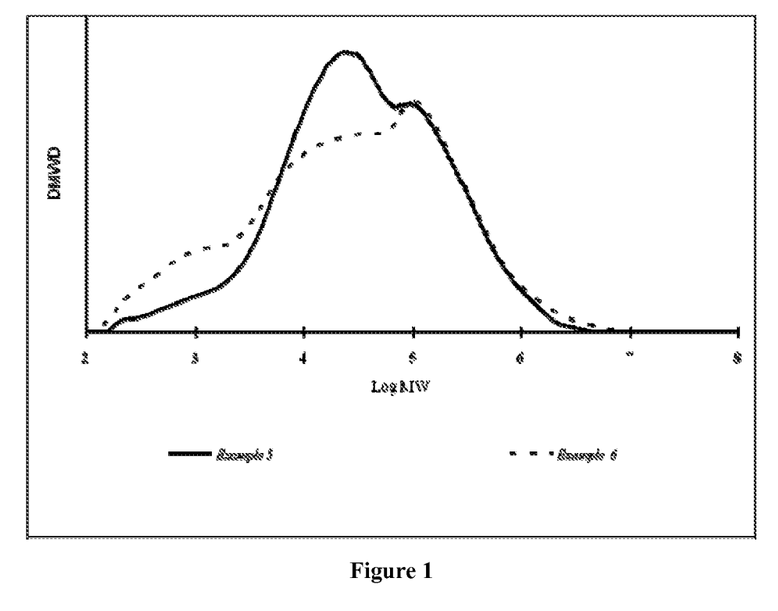
FIG. 1 presents GPC results for polymers formed in Examples 5 and 6.

Catalyst Pair I was tested at two hydrogen levels, with the results shown in Table 3 and FIG. 1.

TABLE 3

Mixed Catalyst System I Hydrogen Response

| Example. | Catalyst Pair | Support/ Activator | $H_2$ (ppm) | Productivity | Mw | Mn | Mw/Mn |
|---|---|---|---|---|---|---|---|
| 5 | I | SMAO | 3000 | 7556 | 125451 | 7215 | 17.4 |
| 6 | I | SMAO | 6000 | 7561 | 153821 | 3485 | 44.1 |

As can be seen from the GPC overlay in FIG. 1, the HMW component showed no movement, while the LMW component moved lower as the $H_2$ concentration increased from 3,000 ppm to 6,000 ppm.

Figure 2:
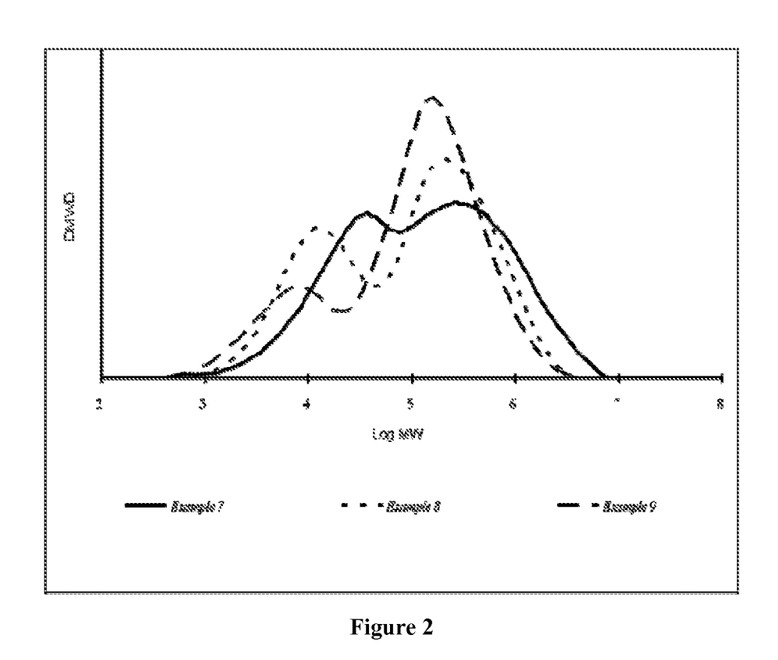
FIG. 2 presents GPC results for polymers formed in Examples 7, 8, and 9.

Comparative Catalyst Pair II was tested at three hydrogen levels, with the results shown in Table 5 and FIG. 2.

TABLE 5

Mixed Catalyst System II Hydrogen Response

| Example | Catalyst Pair | Support/ Activator | $H_2$ (ppm) | Productivity | Mw | Mn | Mw/Mn |
|---|---|---|---|---|---|---|---|
| 7 | II | SMAO | 1500 | 6704 | 430639 | 26820 | 16.1 |
| 8 | II | SMAO | 6000 | 4152 | 256105 | 19610 | 13.1 |
| 9 | II | SMAO | 10000 | 4412 | 224795 | 17100 | 13.2 |

As can be seen from the GPC overlay in FIG. 2, both LMW and HMW components moved lower as $H_2$ increased from 1,500 ppm to 10,000 ppm.

As described above, mixed (e.g., bimetallic) catalyst systems according to embodiments disclosed herein include at least two catalyst compounds, where one or more of the catalyst compounds have essentially no hydrogen response. The catalyst systems according to embodiments disclosed herein may allow for production of polymers having bimodal composition distributions in a single reactor. Limiting the number of catalyst compounds in catalyst systems that have a hydrogen response may allow for control of polymer properties that is considerably less complicated and more predictable, as there are fewer independent variables affecting polymerization dynamics (such as a second catalyst having a different hydrogen response).

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

Only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited.

All documents cited herein are fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A polymerization catalyst system comprising:
    a first catalyst compound; and
    a second catalyst compound;
    wherein the first catalyst compound comprises a biphenyl phenol compound having essentially no hydrogen response, wherein essentially no hydrogen response means the weight average molecular weight of the polymer changes by less than 10% when increasing the reactor hydrogen concentration from 0 to 10,000 ppm;
    wherein the biphenyl phenol compound has one of the two following structures:

(Structure I)

wherein:
    M is selected from the group consisting of Ti, Zr, and Hf;
    each $R^1$ is substituted with a moiety having the following structure:

(Ia)

the a indicates the location where structure Ia is attached to $R^1$, and the O forms a dative bond with metal M;

each of $R^2$ through $R^9$ and $R^{11}$ through $R^{15}$ are independently selected from the group consisting of hydride, hydrocarbyl, lower hydrocarbyl, substituted hydrocarbyl, heterohydrocarbyl, alkyl, lower alkyl, substituted alkyl, heteroalkyl, alkenyl, lower alkenyl, substituted alkenyl, heteroalkenyl, alkynyl, lower alkynyl, substituted alkynyl, heteroalkynyl, alkoxy, lower alkoxy, aryloxy, hydroxyl, alkylthio, lower alkyl thio, arylthio, thioxy, aryl, substituted aryl, heteroaryl, aralkyl, aralkylene, alkaryl, alkarylene, halide, haloalkyl, haloalkenyl, haloalkynyl, heteroalkyl, heterocycle, heteroaryl, heteroatom-containing group, silyl, boryl, phosphino, phosphine, amino, and amine; and X is a leaving group; or

2. The catalyst system of claim 1, further comprising at least one of a support and an activator.

3. The catalyst system of claim 1 or 2, wherein the second catalyst compound comprises at least one of a metallocene and a Group 15-containing catalyst compound.

4. The catalyst system of claim 1 or 2, wherein the second catalyst compound comprises at least one metallocene and at least one Group 15-containing catalyst compound.

5. The catalyst system of claim 1 or 2, wherein the second catalyst compound comprises at least one metallocene selected from those having the following structure:

6. The catalyst system of claim 1 or 2, wherein the second catalyst compound comprises at least one Group 15-containing catalyst compound selected from those having the following structures:

wherein
M is a Group 3 to 14 metal,
each X is independently a leaving group;
n is the oxidation state of M;
m is the formal charge of the YLZ,
L is a Group 15 or 16 element;
Y is a Group 15 element;
Z is a Group 15 element;
$R^1$ and $R^2$ are independently a $C_1$ to $C_{20}$ hydrocarbon group, a heteroatom containing group having up to twenty carbon atoms, silicon, germanium, tin, lead, phosphorus, or a halogen;
$R^1$ and $R^2$ may be interconnected to each other;
$R^3$ is absent or is a hydrogen, a group 14 containing group, a halogen, or a heteroatom containing group;
$R^4$ and $R^5$ are independently an aryl group, a substituted aryl group, a cyclic alkyl group, a substituted cyclic alkyl group, or multiple ring system; and
$R^6$ and $R^7$ are independently absent, or hydrogen, an alkyl group, halogen, heteroatom or a hydrocarbyl group.

7. The catalyst system of claim 1 or 2, wherein the second catalyst compound comprises a Group 15-containing catalyst compound represented by the following structure:

8. A process for producing a polyolefin comprising contacting at least one olefin monomer with the catalyst system of claim 1 or 2.

* * * * *